UNITED STATES PATENT OFFICE.

KURT ALBERT, OF WIESBADEN, GERMANY.

PROCESS OF MAKING SULFUR TRIOXID.

1,018,402.  Specification of Letters Patent.  Patented Feb. 27, 1912.

No Drawing.  Application filed August 2, 1911.  Serial No. 641,966.

*To all whom it may concern:*

Be it known that I, KURT ALBERT, a subject of the Emperor of Germany, and resident at Wiesbaden, Germany, have invented certain new and useful Improvements in Processes of Making Sulfur Trioxid.

The present invention relates to the manufacture of sulfur trioxid, and particularly to the contact method, whereby sulfur dioxid is oxidized to sulfur trioxid in the presence of a suitable catalyzer and at appropriate temperatures, and consists in the manufacture of such acid by the use of a particular catalyzer which I have discovered is very advantageous when used in this process. Ferric oxid from pyrites burners has been extensively used in the production of sulfuric acid by the contact method, but the temperatures at which such catalyzer best operates are from 600° C. to 620° C., and at such temperatures approximately only 65% yield is obtained, while beneath 600° C., the transformation of sulfur dioxid into sulfur trioxid is very slight. This catalyzer too, is very sensitive to moisture.

I have discovered that the combination hereinafter described of ferric peroxid with oxids of the alkaline earths make exceptionally good catalyzers in the process of manufacturing sulfuric acid, and that with the use of such catalyzers approximately 94% yield may be obtained and at temperatures much lower than those necessary in the use of ferric oxid.

Mixtures of ferric oxid with oxids of the alkaline earths absorb oxygen when heated in a current of air or oxygen and form combinations such as those above referred to which according to their reactions must be considered as combinations of ferric peroxid with alkaline earth. (See *Berichte der Deutschen Chemischen Gesellschaft*, 1909 IV, page 4279, by L. Moeser and H. Borch.) By the use of such a combination, (for example) $FeO_2 \cdot SrO$ I have found that 94% of the sulfur dioxid may be transformed to sulfur trioxid at a temperature of approximately 450° C. The temperature at which this process may be carried on may vary within wide limits, for example, between 400° and 640° C., but the best yield is obtained at temperatures ranging from 450° to 550° C. Catalytic bodies of the above type are not so sensitive to moisture as the ferric oxid from pyrites burners.

In the manufacture of sulfuric acid by my process, the sulfur dioxid, together with an oxidizing gas such as air, is pasesd in contact with the catalyzer of the present invention at suitable temperatures and the sulfur trioxid thus obtained is converted into sulfuric acid by absorption in water.

I claim:

1. In the manufacture of sulfuric acid the process which comprises contacting sulfur dioxid with a catalyzer comprising a combination of ferric peroxid and an oxid of an alkaline earth in the presence of an oxidizing gas at temperatures sufficient to form sulfur trioxid.

2. In the manufacture of sulfuric acid the process which comprises contacting sulfur dioxid with a catalyzer comprising a combination of ferric peroxid and an oxid of strontium in the presence of air and at temperatures sufficient to form sulfur trioxid.

3. In the manufacture of sulfuric acid the process which comprises contacting sulfur dioxid with a catalyzer comprising a combination of ferric peroxid and an oxid of an alkaline earth in the presence of air and at temperatures between 450° and 550° C. to form sulfur trioxid.

4. In the manufacture of sulfuric acid the process which comprises contacting sulfur dioxid with a catalyzer comprising a combination of ferric peroxid and an oxid of strontium in the presence of air and at temperatures between 450° and 550° C. to form sulfur trioxid.

In testimony whereof, I have hereunto set my hand in presence of two witnesses.

KURT ALBERT.

Witnesses:
 JEAN GRUND,
 CARL GRUND.